Jan. 13, 1953          D. J. PRICE          2,625,178
QUICK-ACTING VALVE DEVICE
Filed Aug. 7, 1947
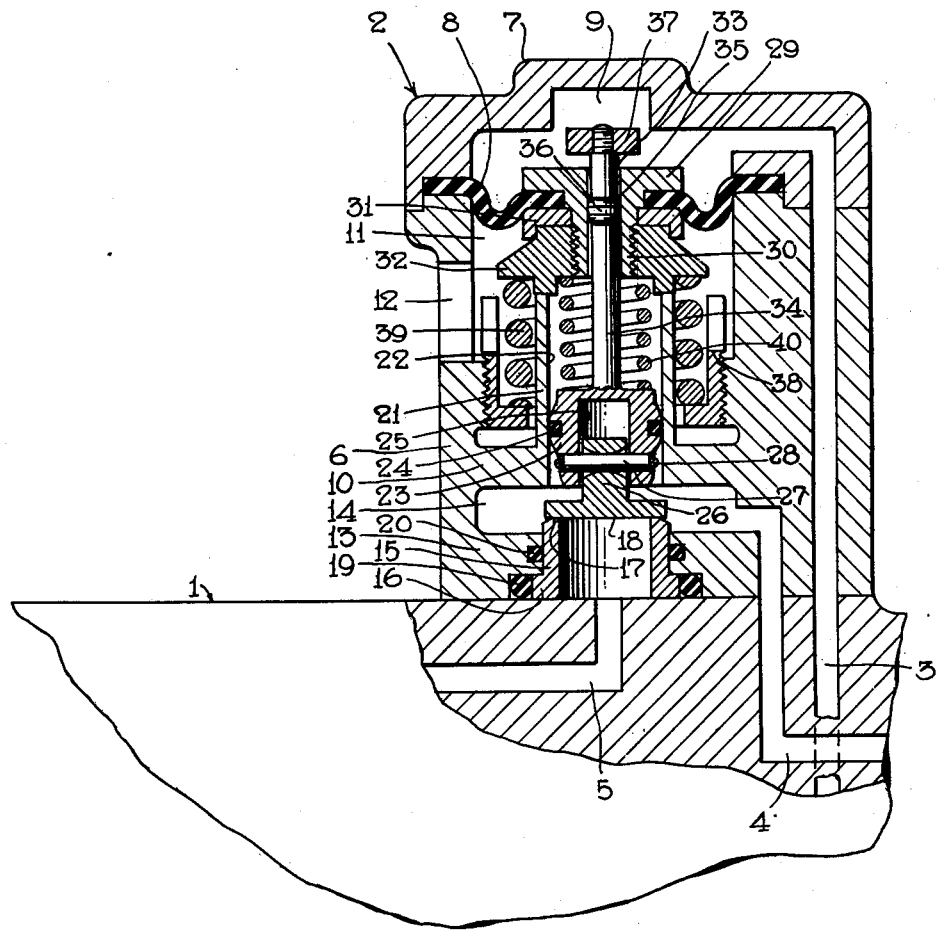
INVENTOR.
Donald J. Price
BY
A. A. Steinmiller
ATTORNEY Patented Jan. 13, 1953

2,625,178

UNITED STATES PATENT OFFICE 2,625,178

QUICK-ACTING VALVE DEVICE

Donald Jay Price, Hewlett, N. Y., assignor to Westinghouse Air Brake Company, a corporation of Pennsylvania Application August 7, 1947, Serial No. 766,973

3 Claims. (Cl. 137—688)

This invention relates to fluid pressure controlled devices and more particularly to the snap acting type; and the principal object of the invention is the provision of such a device arranged to operate upon a chosen reduction in pressure of fluid to suddenly effect a desired operation, such as opening of a fluid pressure communication.

As an example of use of the invention reference may be made to the copending application of A. J. Bent, Serial No. 762,771, filed July 22, 1947, and assigned to the assignee of the present application, in which the device embodying the invention is shown associated with a fluid pressure control apparatus wherein it operates as above mentioned to open a fluid pressure supply communication.

Other objects and advantages will be apparent from the following more detailed description of the invention.

In the drawing, the single figure is a sectional, diagrammatic view of a snap acting device embodying the invention.

Description

As shown in the drawing, the reference numeral 1 designates a bracket upon which is mounted a snap acting valve device 2 embodying the invention; said bracket being provided with a normally charged fluid pressure control passage 3 leading to the valve device 2, a fluid pressure supply passage 4 and a passage 5 adapted to receive fluid under pressure from passage 4, the passages 4 and 5 also leading to the valve device 2 which is adapted to control communication therebetween as will be later described.

The snap acting valve device 2 comprises a casing section 6 having one end mounted on the bracket 1, while suitably secured to the opposite end is a cover 7. A movable abutment, preferably in the form of a flexible diaphragm 8, is clamped around its edge between the casing section 6 and cover 7. The diaphragm 8 cooperates with cover 7 to form a control chamber 9 which is open to the fluid pressure control passage 3. Between the opposite side of diaphragm 8 and the adjacent side of a partition wall 10 is a chamber 11 open to atmosphere through an opening 12 in the casing section 6. Between the opposite side of partition wall 10 and an end wall 13 of the casing section 6 is a chamber 14 which is open to the fluid pressure supply passage 4.

The end wall 13 is provided with an opening in which there is slidably mounted in coaxial relation to diaphragm 8, a sleevelike bushing member 15, the interior of which is open to passage 5.

The bushing 15 has at one end an annular collar 16 disposed in a recess in the casing section 6 and engaging the bracket 1, while its opposite end is disposed in chamber 14 and provides a seat 17 for a disc type valve 18 contained in said chamber for controlling communication between passages 4 and 5.

A sealing ring 19 encircling the bushing collar 16 has sealing contact therewith, and with the bracket 1 and casing section 6 for preventing leakage of fluid under pressure from within the bushing 14 and passage 5 through the joint between the bracket 1 and casing section 6. A similar sealing ring 20 carried by the casing section 6 has sealing engagement with the peripherial surface of bushing 15 for preventing leakage of fluid under pressure through the joint between said casing section and bushing.

Projecting from the partition wall 10 into the atmospheric chamber 11 is an integral sleeve 21, and extending through said sleeve and wall is a bore 22 in which is mounted a plunger 23. The plunger 23 comprises a central annular portion the peripheral surface of which is spherical in form and in substantial sliding contact with the wall of bore 22 and provided with an annular groove in which is disposed a sealing ring 24 having sealing and sliding contact with said wall. The plunger 23 has an axial bore 25 open at one end to chamber 14 and closed at the opposite end and extending into this bore is a stem 26 of smaller diameter than said bore and formed integral with and projecting from the side of the disc valve 18 opposite the seating side. A pin 27 carried in diametrically arranged bores in plunger 23 at either side of bore 25 extends through a bore in the valve stem 26 connecting the valve 18 for movement with said stem. The pin 27 is held in plunger 23 by a ring 28 tensioned around the plunger 23 within a suitable annular groove therein. The bore through the valve stem 26 in which the pin 27 is disposed is slightly larger in diameter at the center of said stem than said pin and tapers outwardly in both directions from the center of said stem. The valve 18 is thereby connected to plunger 23 with a certain degree of looseness and is capable of universal movement about its connection with pin 27 to ensure such adjustment of said valve relative to said plunger as to permit seating of said valve squarely on its seat 17. The area of plunger 23 open to chamber 14 preferably slightly exceeds that of valve 18 over the outer portion of seat 17 engaged by said valve.

A diaphragm follower 29 contained in diaphragm chamber 9 in contact with one side of diaphragm 8, has a central stud portion 30 extending centrally through said diaphragm into chamber 11. A follower 31 mounted over the stud portion 30 in chamber 11 contacts the opposite side of diaphragm 8, and a nut 32 also contained in chamber 11 and having screw-threaded engagement with said stud portion engages follower 31 for clamping the central portion of said diaphragm between said follower and the follower 29.

The follower 29 and stud portion 30 thereof have an axial bore 33 and extending from the end of plunger 23, opposite the end carrying the valve 18, through the atmospheric chamber 11 and said axial bore into chamber 9 is a stem 34 formed integral with said plunger. The stem 34 is provided within the bore 33 with an enlarged annular portion 35 having a spherical peripheral surface in substantial contact with the wall of said bore and carrying within an annular groove an annular sealing ring 36 having sealing and sliding contact with the wall of said bore, it being noted that the stem 34 at either side of the annular portion 35 is of smaller diameter than the bore. A nut 37 is secured to the end of the stem 34 within chamber 9 for contact by the diaphragm follower 29.

An adjustable seat 38 contained in chamber 11 and having screw-threaded engagement with casing section 6 supports one end of a compressed control spring 39 the opposite end of which bears against the diaphragm clamping nut 32. A relatively light, compressed spring 40 encircling the stem 34 within the sleeve 21 bears at one end against the nut 32 while the opposite end bears against plunger 23.

*Operation*

In operation, let it be assumed that passage 3 in the bracket 1, and thereby diaphragm chamber 9 in the valve device 2, are charged with fluid at a pressure sufficient to deflect diaphragm 8 against springs 39 and 40 to the position in which it is shown in the drawing, as defined by contact between the diaphragm clamping nut 32 and the end of sleeve 21. With the diaphragm 8 in this position the plunger 23 will be actuated by spring 40 to move the valve 18 into contact with its seat 17 to close communication between passages 4 and 5. With the parts in the position just described, it will be noted that the nut 37 on the end of stem 34 is spaced away from the follower 29.

Let it further be assumed that passage 4 and thereby chamber 14 are charged with fluid under pressure. In chamber 14 this pressure of fluid will act to force the valve 18 against its seat and will also act in the opposite direction against plunger 23. Since the area of plunger 23 subject to pressure of fluid in chamber 14 is slightly greater than that of the seated valve 18 over the outside diameter of the seat 17, a differential in fluid forces is created tending to move the plunger 23 in the direction to unseat the valve 18, but this tendency is offset by the pressure of spring 40, and will be maintained offset by said spring when extended sufficiently for diaphragm follower 29 to engage the nut 37.

Now let it be assumed that it is desired to open valve 18. To accomplish this, fluid under pressure will be released from chamber 9 by way of passage 3. When the pressure of fluid in chamber 9 is thus reduced to a degree below the opposing force of springs 39 and 40 in diaphragm 8 said springs will deflect said diaphragm in the direction of chamber 9, and such deflection will continue as the reduction in pressure in said chamber continues.

As the diaphragm 8 is deflected in response to reducing pressure of fluid in chamber 9, such movement will be relative to the plunger 23, stem 34 and seated valve 18 until the nut 37 is engaged by the diaphragm follower 29, and during such relative movement the spring 40 will extend and its pressure on plunger 23 reduce. The pressure of spring 40 even upon engagement of diaphragm follower 29 with nut 37 will, however, still be sufficient to hold the plunger 23 in the position in which it is shown in the drawing and in which position the valve 18 is still seated. However, when the diaphragm follower 29 engages the nut 37 the spring 40 will be caged between said nut and the plunger 23 and therefore be rendered ineffective to coact with spring 39 upon further reduction in pressure in chamber 9. When the spring 40 thus becomes ineffective, the differential in fluid forces acting on valve 18 and plunger 23 becomes effective through said spring to aid the spring 39 to deflect the diaphragm 8 against reducing pressure in chamber 9. When the pressure in chamber 9 then becomes further reduced sufficiently, the spring 39 and the differential in fluid forces on plunger 23 and valve 18 will effect further deflection of diaphragm 8, and this deflection acting through the nut 37, stem 34 and plunger 23 will pull the valve 18 out of contact with seat 17.

Immediately upon unseating of valve 18, fluid under pressure will flow from chamber 14 past said valve to the interior of bushing 15 and passage 5. The fluid under pressure thus provided in bushing 15 will promptly provide a certain increase in pressure therein which is effective over the full seating face of valve 18. This will reduce the differential in fluid pressures acting on opposite sides of valve 18 which in turn will provide a corresponding increase in the differential in fluid forces on said valve and plunger 23 acting in an upwardly direction, whereby the diaphragm 8 and plunger 23 will promptly move upwardly to a greater extent against the reducing pressure of fluid in chamber 9, and as a result, the valve 18 will be opened to a greater extent. The reduction in differential in fluid forces on opposite sides of the valve 18 will increase in proportion to the opening of said valve, and after a certain opening is obtained said differential will become so reduced, that the differential in fluid forces on said valve and plunger will become increased to a degree which will exceed the force of spring 40, whereupon the plunger 23 will move against said spring, relative to the diaphragm 8 and pull the valve 18 to a fully open position which may be defined by contact between said valve and the portion of the casing in chamber 14 encircling the bore 22.

It will now be seen that upon reducing the pressure of fluid in chamber 9, when passage 4 is charged with fluid under pressure, the diaphragm 8 will operate, at a certain reduced pressure in chamber 9, to crack open the valve 18, and promptly in response thereto the plunger 23 will operate relative to said diaphragm to move said valve to a wide open position to obtain a prompt flow of fluid under pressure from passage 4, as desired.

A maximum degree of sensitivity to pressure changes and hence accuracy in operation at certain pressures is obtained by the relatively narrow annular area of friction contact between sealing ring 36 and the wall of bore 33 and between the sealing ring 24 in plunger 23 and the wall of bore 22, as well as by the spherical surfaces on stem 34 and plunger 23, at either side of the sealing rings 36 and 24, respectively, which permit relatively free adjustment of the parts relative to each other during their operation.

Having now described my invention, what I claim as new and desire to secure by Letters Patent, is:

1. A fluid pressure controlled snap acting valve device comprising a casing, a valve therein controlling a communication between an inlet passage adapted to be charged with fluid under pressure and an outlet passage, a fluid pressure controlled movable abutment, spring means operative by said abutment when subject to a certain pressure of fluid to close said valve, means operative upon a certain movement of said abutment relative to said valve in response to reducing said pressure of fluid on said abutment to render said spring ineffective and to initiate opening of said valve, and means subject to pressure in said inlet and an opposing lower pressure operative by the pressure in said inlet upon opening of said valve being initiated to move said valve relative to said abutment against said spring to a wide open position.

2. A fluid pressure controlled snap acting valve device comprising a casing, a valve therein controlling a communication between an inlet passage adapted to be charged with fluid under pressure and an outlet passage, a plunger in said casing in coaxial relation to said valve and having on one side a greater area subject to pressure of fluid in said inlet passage than the seated area of said valve, means subjecting the opposite side of said plunger to fluid at a pressure lower than in said inlet passage, means connecting said plunger and valve rendering pressure of fluid on said plunger effective to unseat said valve, a coaxially arranged movable abutment movable in a direction away from said plunger upon reduction in pressure of fluid in a control chamber, a spring interposed between said abutment and plunger for actuating said plunger to seat said valve, means connecting said plunger to said abutment for movement by said abutment to unseat said valve in response to a reduction in pressure in said control chamber, the last named means providing for movement of said plunger and valve by pressure of fluid on said plunger against said spring and relative to said abutment.

3. A fluid pressure controlled snap acting valve device comprising a casing having a fluid pressure inlet chamber adapted to be charged with fluid under pressure and having an outlet for receiving fluid under pressure from said chamber, a valve in said chamber arranged to cooperate with a seat in said casing for controlling communication between said chamber and outlet and normally urged into contact with said seat by pressure of fluid in said chamber, a plunger slidably mounted in a bore in said casing in coaxial relation with said valve and having an area on one side subject to pressure of fluid in said chamber which area is greater than the seated area of said valve, means subjecting the opposite side of said plunger to atmospheric pressure, means connecting said valve for movement by said plunger, a flexible diaphragm disposed in said casing in coaxial relation to said plunger, and subject on one side to pressure of fluid in a control chamber, a spring interposed between said diaphragm and plunger for urging said plunger in a direction to seat said valve, means operative upon a reduction in pressure of fluid in said control chamber to deflect said diaphragm in a direction away from and relative to said plunger and means operative upon a certain movement of said diaphragm away from and relative to said plunger to actuate said plunger to unseat said valve and providing for continued movement of said plunger and valve relative to said diaphragm against said spring by pressure of fluid in said inlet chamber acting on said plunger.

DONALD JAY PRICE.

REFERENCES CITED

The following references are of record in the file of this patent:

UNITED STATES PATENTS

| Number | Name | Date |
|--------|------|------|
| 1,579,785 | Rouleau | Apr. 6, 1926 |
| 1,646,640 | Daniel | Oct. 25, 1927 |
| 2,046,640 | Loftus | July 7, 1936 |
| 2,074,292 | Wilkins | Mar. 16, 1937 |